United States Patent [19]
Bobo

[11] Patent Number: 5,228,784
[45] Date of Patent: Jul. 20, 1993

[54] SQUEEZE FILM DAMPER COMPOSITE RING SEAL

[75] Inventor: Melvin Bobo, Cincinnati, Ohio

[73] Assignee: General Electric Company, Cincinnati, Ohio

[21] Appl. No.: 700,840

[22] Filed: May 16, 1991

[51] Int. Cl.⁵ .............................................. F16C 27/00
[52] U.S. Cl. ...................................... 384/99; 384/487
[58] Field of Search ................ 384/99, 487, 535, 581, 384/489, 152

[56] References Cited

U.S. PATENT DOCUMENTS

| | | |
|---|---|---|
| 3,652,139 | 3/1972 | Memery . |
| 4,337,983 | 7/1982 | Hibner . |
| 4,404,724 | 9/1983 | Christ et al. ........................... 29/116 |
| 4,669,893 | 6/1987 | Chalaire et al. ...................... 384/99 |
| 4,775,248 | 10/1988 | Barbic et al. ........................... 384/99 |
| 4,783,179 | 11/1988 | Katayama et al. ................... 384/130 |
| 4,952,076 | 8/1990 | Wiley et al. ........................... 384/535 |
| 4,971,457 | 11/1990 | Carlson ................................... 384/99 |
| 5,056,935 | 10/1991 | Singh ...................................... 384/99 |
| 5,071,262 | 12/1991 | Monzel et al. ......................... 384/99 |

OTHER PUBLICATIONS

"Experimental Measurement of the Dynamic Force Response of a Squeeze-Film Bearing Damper", Transsactions of the ASME, Nov. 1975, p. 1283.

*Primary Examiner*—Lenard A. Footland
*Attorney, Agent, or Firm*—Jerome C. Squillaro; John R. Rafter

[57] ABSTRACT

A piston type ring which includes a continuous synthetic material O-ring concentrically mounted thereon in a groove in the outer circumference of the ring is utilized as a piston ring seal in a squeeze film damper.

8 Claims, 2 Drawing Sheets

SQUEEZE FILM DAMPER COMPOSITE RING SEAL

BACKGROUND OF THE INVENTION

This invention relates to vibration damping in high speed turbomachinery such as hot gas turbine engines, for example, aircraft gas turbine engines, and more particularly to an improved piston ring seal for squeeze film damping means associated with bearing supports for the shaft and turbine rotor of aircraft gas turbine engines.

The occurrence of cyclical orbital motion of the turbine wheel shaft of a hot gas turbine engine is well known in the prior art and hydraulic damping means, for example, squeeze film dampers are utilized to damp vibrations caused by an imbalance in the rotary mass with resultant orbital movement of the turbine wheel shaft. In general such dampers include the use of an oil under pressure in a defined annular squeeze film space between a bearing support member such as the annular outer race of a rolling element bearing and an opposing cylindrical wall of a chamber in the bearing supporting housing in which the race is confined with permitted limited radial and orbital motion.

In such devices as described, circular metal piston seal rings are often employed to control leakage or passage of damper oil out of the defined annular squeeze film space. The rings may be disposed in grooves in the outer race. The pressure of the damper oil being sealed is typically used to urge the piston ring into lateral sealing engagement with a groove sidewall, and into radial sealing engagement with the opposing cylindrical wall of the chamber.

Such rings are usually formed from a length of metal strip into a circular configuration to have closely spaced abutting ends defining the end gaps of a piston ring seal. These end gaps permit installation of the piston ring in the damper, allow for dimensional variations due to thermal growth and mechanical tolerances, and permit the ring to expand and contract during varying damper operating conditions to maintain radial peripheral sealing engagement with the opposing cylindrical wall of the chamber. The end gaps can be sized to permit a small, regulated amount of flow past the piston ring seal, but are normally kept small, and may include overlapping ends to reduce leakage.

Lateral and radial sealing of the ring is a very important factor of damper operation. As mentioned above, known designs use damper fluid pressure to urge the ring laterally into sealing engagement with a groove sidewall and radially into sealing engagement with the opposing cylindrical wall of the chamber.

However, use of the damper fluid pressure for ring sealing can be disadvantageous for a number of reasons. For example, while piston rings in the typical automotive applications are subject to circumferentially uniform pressures, piston rings in squeeze film dampers are subject to a circumferentially varying pressure wave in the damper squeeze film, which will be described in greater detail below. The pressure wave has circumferentially traveling high and low pressure regions. The high pressure region of the pressure wave may act to radially unseat the piston ring from radial engagement with the opposing cylindrical wall of the chamber, with resulting leakage and reduced damper effectiveness. Even where the groove and ring are carefully designed for proper radial pressure balance on the piston ring, unseating and leakage may occur under some operating conditions.

The low pressure region of the traveling pressure wave, which may be lower than the ambient or sump pressure, may act to laterally unseat the piston ring from lateral engagement with a groove sidewall, resulting in leakage, as well as air entrainment in the squeeze film space.

In addition, lateral sealing of the piston ring against a groove sidewall generates friction forces which resist radial movement of the piston ring in its groove. These friction forces diminish the rings ability to maintain radial sealing engagement with the opposing cylindrical wall as pressure in the squeeze film varies due to the traveling pressure wave.

Because of these difficulties in sealing brought on by the variations in damper fluid pressure, scientists and engineers continue to search for improved means of sealing in squeeze film dampers.

OBJECTS OF THE INVENTION

It is an object of this invention to provide an improved piston ring type seal for squeeze film dampers.

It is another object of this invention to provide a radial sealing system in a squeeze film damper which is not dependent on damper fluid pressure on piston rings for sealing.

It is another object of this invention to prevent entrainment of air into the squeeze film space in the low pressure region of the squeeze film.

It is another object of this invention to provide improved lateral sealing at piston ring groove sidewalls.

It is another object of this invention to reduce leakage at abutting ends of piston ring seals.

It is another object of this invention to provide an improved combination metal/non-metal piston ring type seal for squeeze film dampers where resiliency of the non-metal component provides additional sealing pressure during varying sealing pressure conditions.

It is a further object of this invention to provide a combination metal piston ring and elastomer material O-ring seal for squeeze film dampers.

SUMMARY OF THE INVENTION

In a closed end squeeze film damper, a metal piston ring of rectangular cross section includes a circumferential groove facing an opposite circumferential wall for fluid sealing purposes. The opposite circumferential wall may be cylindrical. A resilient non-metal continuous O-ring is fitted in the groove to provide primary fluid sealing with the cylindrical wall, without reliance on damper fluid pressure balance to urge the ring into sealing engagement with the opposite cylindrical wall. The piston rings can be sized to closely fit in grooves for lateral sealing. The O-ring can be sized with respect to the piston ring to urge together abutting ends of the piston ring during damper operation, thereby reducing leakage through the piston ring end gap.

This invention will be better understood when taken in connection with the following drawings and their description.

DESCRIPTION OF A PREFERRED EMBODIMENT

Figure 1:
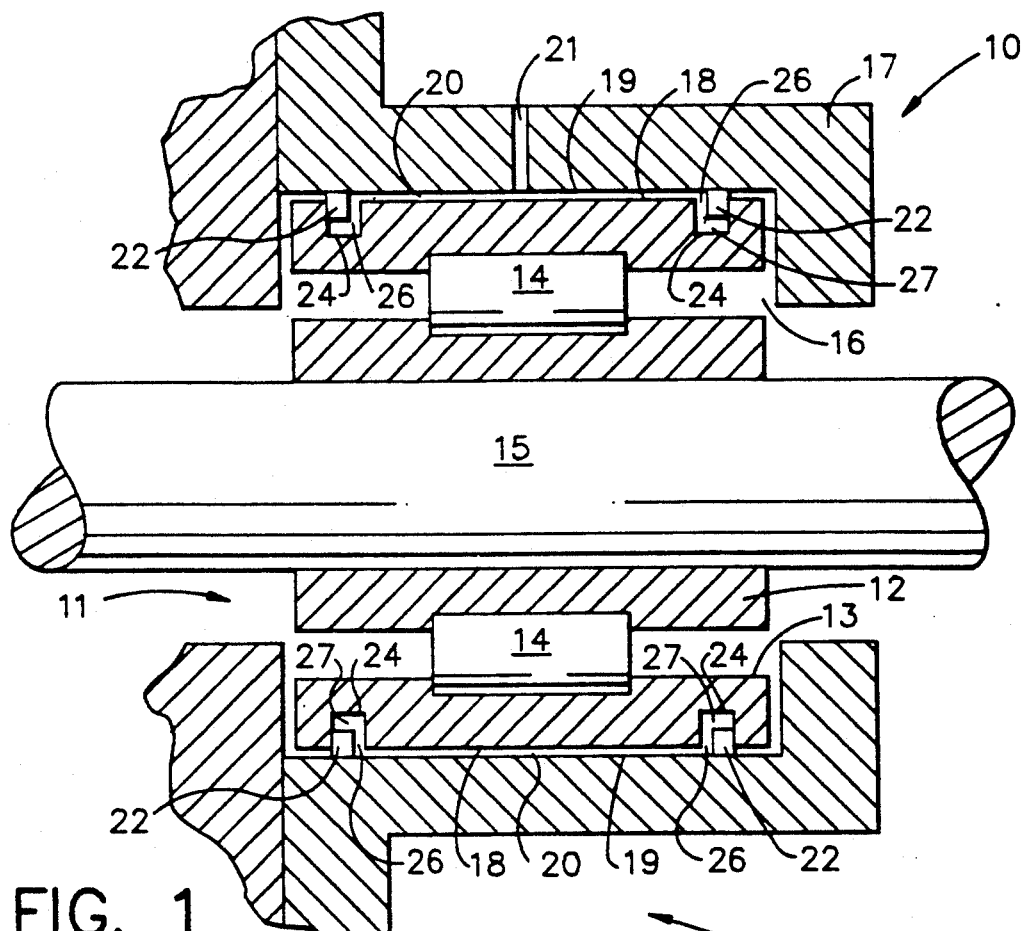
FIG. 1 is a schematic illustration of a known closed end squeeze film damper device.

Referring now to FIG. 1, a squeeze film damper assembly 10 is schematically illustrated in conjunction with a rolling element bearing 11. Bearing 11 comprises an inner annular race 12 and a spaced outer annular race 13, between which rolling elements 14 are positioned to support shaft 15 for rotation. As illustrated in FIG. 1, outer race 13 is sized for limited reciprocating motion, in a closely confining annular chamber 16 in supporting housing 17 of, for example, a hot gas turbine engine. The outer circumferential surface 18 of race 13 is spaced from the inner circumferential wall 19 of chamber 16 to define an annular squeeze film space 20. Bearing assembly 11, together with shaft 15 and race 13, is permitted to move in chamber 16 in a reciprocating manner by race 13 moving towards and away from the opposing circumferential wall 19 of chamber 16. However, this movement is controlled or restricted by damper fluid, usually an oil under pressure, which is introduced into squeeze film space 20 through inlet passage 21. As illustrated in FIG. 1, outer race surface 18 and chamber wall 19 define a pair of oppositely facing circumferential surfaces, and any orbiting motion of shaft 15 is transmitted to race 13. Orbital motion causes opposite regions of annular space 20 to be alternately decreased and expanded. The decrease causes a squeezing action on oil in space 20 and a circumferential viscous flow in the annular squeeze space. This viscous circumferential flow which is produced by orbiting motion and changing thickness of squeeze film space 20, generates a substantial circumferential variation of fluid pressures. The result is the generation of a damping resistance to orbital motion of race 13. Appropriate mechanical restraints may be employed to prevent undue rotation of race 13 but permitting orbital motion. The arrangement as described is well known in the art and is referred to as a squeeze film damper, finding particular application to high speed turbomachinery, for example, to damp vibration in a rotor shaft of an aircraft gas turbine engine.

Figure 2:
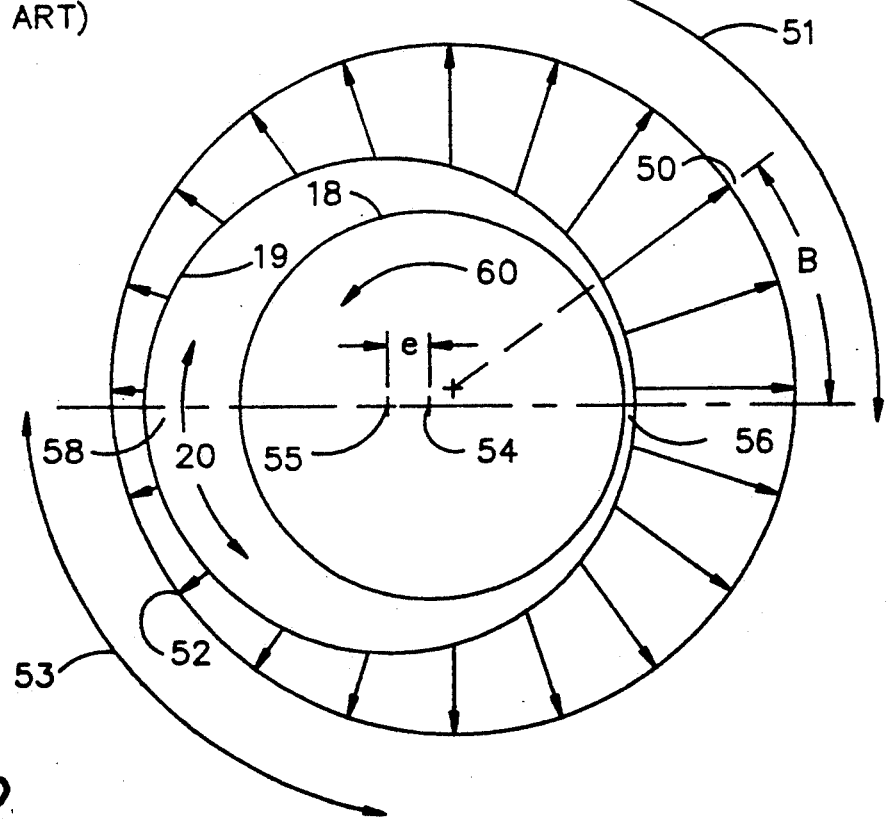
FIG. 2 is a schematic illustration of the traveling pressure wave in a squeeze film space.

Referring to FIG. 2, the hydrodynamics of the fluid in damper space 20 involves a number of factors such as the length and thickness of the film, as well as the viscosity of the fluid, shape of the orbit, and speed of the orbit. FIG. 2 shows the general nature of the fluid pressure circumferential pressure distribution in space 20 during counter clockwise (arrow 60) orbiting motion of shaft 15 within cylindrical surface 19. The orbiting is characterized by an eccentricity e between a center 54 of shaft 15 and outer race surface 18, and center 55 of chamber surface 19. A high pressure region 51 and a low pressure region 53 are created in squeeze film 20 due to the orbiting motion of surface 18 with respect to surface 19. The maximum pressure location is indicated at 50, the minimum pressure location is indicated at 52, the minimum film thickness in space 20 is indicated at 56, and the maximum film thickness is indicated at 58.

The maximum pressure location 50 generally leads the point of minimum film thickness 56 by a phase angle, indicated as angle B in FIG. 2. The pressure wave shown in FIG. 2 travels circumferentially with the motion of the bearing outer race support member 13 within the housing 17.

Oil is retained in annular space 20 of FIG. 1 by means of spaced apart piston rings 22 located at opposite ends of the squeeze film space 20, thereby forming a closed end squeeze film space 20. Each ring 22 is seated in a respective circumferentially extending groove 24 disposed in outer race 13. It is an important function of rings 22 to retain oil in space 20 in a proscribed pressure range by limiting oil leakage past rings 22. Proper functioning of a damper involves a continuous supply and recirculation of oil through the damper and any oil flow past rings 22 becomes a part of this recirculating flow.

In the damper assembly 10 of FIG. 1, piston rings 22, as previously described, are usually formed from a hard metal strip into a circular configuration in which the ends of the strip are in closely spaced abutting relationship defining what is referred to as an end gap therebetween. Such a gap serves as a variable adjusting means to accommodate design tolerances and operational temperature differences during damper operation, and also provides a leakage path for damper fluid.

Two important sealing regions for rings 22 include the radial interface between the outer circumference of a ring 22 and the cylindrical wall 19, and the lateral interface between ring 22 and groove 24 sidewalls.

Lateral sidewall sealing of a ring is assisted by utilization of existing damper fluid pressure to exert a force against the rings to press the rings against a sidewall of their groove. For example, as illustrated in FIG. 1, a circumferentially extending vent space 26 is provided between each piston ring 22 and its respective groove 24. These vent spaces 26 are in fluid flow communication with fluid in space 20. The fluid pressure in space 20 thereby exerts a force on the vent side of a ring 22 to bias the ring into lateral sealing engagement with the opposite sidewall of groove 24 for lateral ring-to-groove sidewall fluid sealing. However, under certain adverse operating conditions, the pressure in the low pressure region of squeeze film 20 may drop below the ambient (or sump) pressure in chamber 16. As a result, ring 22 will be urged away from the groove sidewall and toward the squeeze film space 20. Vent space 26 is disadvantageous in that it provides a lateral clearance which allows ring 22 to become unseated from the groove sidewall. Thus air from chamber 16 can be entrained in squeeze film 20. In addition, vent spaces 26 provide a circumferentially continuous flow path from the high pressure region to the low pressure region in the squeeze film pressure wave. Damper fluid flowing circumferentially in the vent space 26 from the high to low pressure region diminishes the magnitude of the pressure wave, and reduces damper effectiveness.

Further important damper fluid sealing takes place along the ring periphery as it radially engages circumferential wall 19 of chamber 16 in housing 17. During damper operation, the high pressures generated in the traveling pressure wave in space 20 may unseat rings 22 from surface 19. At any circumferential location, a pressure intermediate the pressure in space 20 and the ambient sump pressure acts to urge the rings 22 radially inwardly, as is well known by those skilled in the art of fluid sciences. Peripheral sealing engagement of a ring with wall 19 is primarily accomplished by means of circumferentially extending ring gland spaces 27. Rings 22, when seated in their respective grooves 24, define gland spaces 27. Gland spaces 27 are in fluid communication with squeeze film space 20 by means of vent spaces 26. Fluid pressure in squeeze film 20 is communicated to gland spaces 27 to urge piston rings 22 outwardly into radial sealing engagement with surface 19.

Accordingly, in the prior art damper, proper peripheral sealing of a ring 22 against housing wall 19 is a function of timely availability of damper fluid pressure in gland space 27. Where fluid pressure in gland space 27 becomes less than damper fluid pressure in squeeze film space 20, the pressure difference may cause the ring 22 to become unseated from circumferential wall 19, with resultant excess fluid leakage and reduced damper effectiveness. In addition, the friction forces due to the ring-to-groove lateral sidewall sealing resist radial motion of rings 22 in grooves 24. As a result, rings 22 may not always maintain radial sealing engagement with surface 19 as the pressure in squeeze film 20 varies, even where the pressure in gland 27 is balanced to closely match the pressure in space 20.

The present invention provides a combination piston ring-O-ring seal which improves and continues peripheral piston ring sealing under the noted differential pressure conditions without principal reliance on fluid pressure in gland space 27. At the same time, the rings of this invention fit snugly in their grooves, a combination which minimize adverse effects of vent spaces 26 by eliminating the vent spaces through the use of snug fitting rings.

Figure 3:
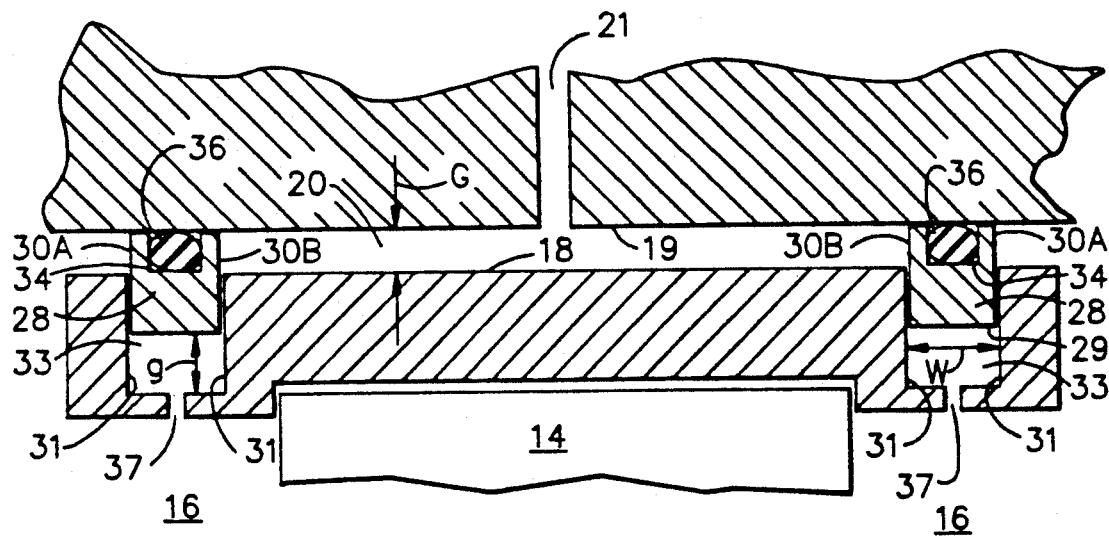
FIG. 3 is a cross-sectional and schematic illustration of a squeeze film damper in accordance with the present invention, showing a pair of combination piston ring/O-ring seals in their operative position in a squeeze film damper.
Figure 4:
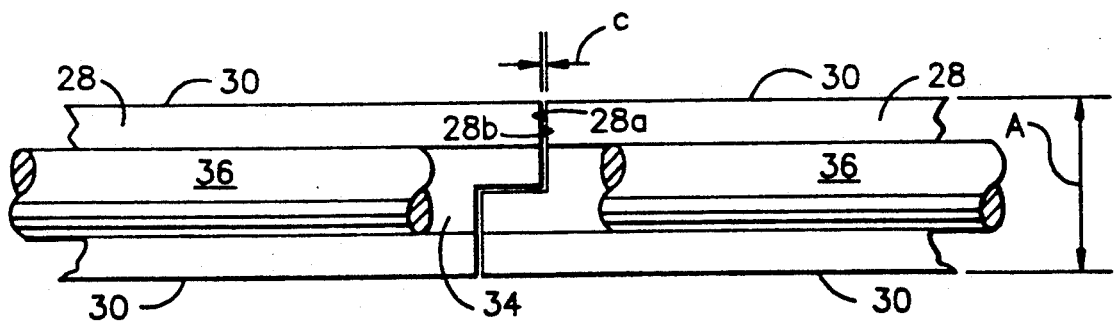
FIG. 4 is a schematic illustration of piston ring overlapping abutting ends urged together by the O-ring, in accordance with the present invention.

Referring now to FIGS. 3 and 4, a squeeze film damper in accordance with the present invention is illustrated together with a pair of combination seal rings 28. Each seal ring 28 includes oppositely facing ring sidewalls 30A and 30B, and a circumferentially extending concentric groove 34. Outer bearing race 13 includes a spaced pair of parallel, rectangular cross section grooves 33 in its outer circumference. Grooves 33 include a pair of spaced apart sidewalls 31, and receive combination seal rings 28 therein in close fitting relationship without a vent space 26. The lateral, or axial, width A of each seal ring is preferably sized for minimal lateral clearance in grooves 33, having width W, while still permitting smooth radial motion of seal rings 28 in grooves 33. Such clearance will vary with bearing dimensions, and can be calculated by those skilled in the art of mechanical design. Each groove 33 is sized for radial clearance g with respect to its seal ring 28 for radial movement of a ring in its groove.

Lateral ring-to-groove sidewall sealing is provided primarily by the close fit of the each seal ring 28 in its groove 33. Under normal operating conditions where the pressure in space 20 exceeds the sump pressure in chamber 16, pressure in squeeze film space 20 will also assist ring-to-groove sidewall sealing by urging a ring sidewall 30A into lateral engagement with a groove sidewall 31 on the opposite side of groove 33 from squeeze film space 20. The close fit of each seal ring 28 in its respective groove 33 will limit lateral motion of ring 28 in its groove, thereby limiting air entrainment into space 20 in the event that the sump pressure in chamber 16 exceeds the pressure in space 20.

Radial sealing at surface 19 is provided by an O-ring 36 associated with each seal ring 28. As shown in FIGS. 3 and 4, each combination seal ring 28 is of generally rectangular cross section, and contains a concentric radial groove 34 in the radially outer face thereof. The outer diameter of each ring 28 is sized somewhat smaller than the diameter of housing wall 19 to provide clearance therebetween to accommodate thermal growth and prevent binding or locking of ring 28 against wall 19. A continuous rubbery material or elastomer O-ring 36 is fitted in the ring groove 34 with some protrusion or projection therefrom so that O-ring 36 peripherally engages the opposite wall 19 for effective sealing. Thus, O-ring 36 maintains radial sealing engagement with housing wall 19 regardless of, and independently of, the pressure forces acting on ring 28. Among elastomer materials with rubber characteristics are polyisoprenes, copolymers of ethylene and propylene, chlorinated butadiene and the like materials. The cross-sectional thickness of O-ring 36 can be sized so that it will continue to maintain its sealing relationship with surface 19 for any radial movement of seal ring 28 in groove 33, including the largest or maximum gap between the ring 28 and housing wall 19, and during transient operating pressure differences where a ring may tend to become unseated from housing wall 19.

The diameter of O-ring 36 can be sized with respect to the diameter of ring 28 so that the resiliency of O-ring 36 holds the end gap C (FIG. 4) closed when O-ring 36 is installed in groove 34. Leakage through the end gap C can be reduced by holding the end gap closed.

The inside diameter of the metal ring, with ends abutting, is somewhat smaller than the inside diameter of wall 18 (FIG. 1), making appropriate allowance for tolerances, temperatures, etc. With the use of the composite rings of this invention, gland space pressure is not a critical requirement for sealing purposes, and accordingly, the rings of this invention can be quite snugly fitted in their grooves, thereby markedly restricting the flow of damper fluid across the rings. Some leakage past rings 28 is desirable for recirculation and cooling of the damper fluid. Vent passages 37 in grooves 33 provide a recirculation path to the ambient sump pressure for damper oil leaking past rings 28. In the event that more leakage flow past rings 28 is desired for cooling purposes, radially extending grooves can be machined in ring sidewalls 30B to provide fluid passage from space 20 to vent passages 37. Such radial grooves can provide increased recirculation flow without increasing the lateral clearance of ring 28 in groove 33.

The combination of O-ring 36 resiliency and appropriate venting passages 37 for groove spaces 33 will lower pressure and assist in keeping the ring gaps closed under most operating conditions.

This invention provides a composite damper ring seal comprising a hard metal gap ring with a radial and concentric groove in its outer surface, and a rubbery or elastomer material continuous O-ring fitted in the groove and overlying the ring gap. The O-ring provides primary sealing to an opposing circumferential wall with less reliance on damper fluid pressure under a ring to promote sealing.

While this invention has been disclosed and described with respect to a preferred embodiment, it will be understood by those skilled in the art that various changes and modifications may be made without departing from the spirit and scope of the invention as set forth in the following claims.

What is claimed is:

1. In a squeeze film damper assembly comprising a housing having an annular chamber therein and an annular bearing support member in said chamber and adapted for radial motion therein, said bearing support having a pair of spaced apart parallel ring grooves therein, an improved sealing ring in said grooves and projecting therefrom to sealingly engage said housing, said sealing ring comprising in combination (a) a hard metal strip formed into a circular configuration with the ends thereof in closely spaced abutting relationship, (b) said metal strip in circular configuration having a concentric groove therein in the circumferential outer surface thereof, and (c) a non-metal continuous circular ring insert fitting concentrically in said groove and projecting therefrom to sealingly engage an opposite circumferential surface.

2. The invention as recited in claim 1 wherein said non-metal insert comprises a synthetic rubbery material.

3. The invention as recited in claim 1 wherein said non-metal insert comprises an elastomer material.

4. The invention as recited in claim 1 wherein said bearing support is the outer race of a rolling element bearing.

5. The invention as recited in claim 1 wherein said hard metal strip is of a rectangular cross section.

6. The invention as recited in claim 1 wherein said groove in said circular ring is of rectangular cross section.

7. The invention as recited in claim 1 wherein said insert is of circular cross section.

8. The invention as recited in claim 1 wherein said insert comprises an elastomeric material.

* * * * *